US007686319B1

(12) United States Patent
Fink

(10) Patent No.: US 7,686,319 B1

(45) Date of Patent: Mar. 30, 2010

(54) DOUBLE AMPUTEE CONVEYANCE

(75) Inventor: William M. Fink, Phoenix, AZ (US)

(73) Assignee: Robert M Fink, Tempe, AZ (US)

( * ) Notice: Subject to any disclaimer, the term of this patent is extended or adjusted under 35 U.S.C. 154(b) by 196 days.

(21) Appl. No.: 11/443,676

(22) Filed: May 31, 2006

(51) Int. Cl.
*A61G 5/02* (2006.01)
*B62M 1/14* (2006.01)

(52) U.S. Cl. .................. 280/304.1; 5/81.1 HS; 5/86.1; 297/344.1

(58) Field of Classification Search ............. 280/250.1, 280/304.1, 647; 5/618, 86.1, 68, 433, 81.1 HS; 297/DIG. 10, DIG. 4, 183, 338, 339, 411, 297/383, 330, 437, 429, 344.1, 344.11, 183.1, 297/411.2

See application file for complete search history.

(56) References Cited

U.S. PATENT DOCUMENTS

| | | | | | |
|---|---|---|---|---|---|
| 2,869,614 | A | * | 1/1959 | Wamsley | 280/230 |
| 3,261,031 | A | * | 7/1966 | Gates | 5/86.1 |
| 3,285,619 | A | * | 11/1966 | Kitrell et al. | 280/657 |
| 3,589,769 | A | * | 6/1971 | Bressler | 297/42 |
| 3,865,427 | A | * | 2/1975 | Delany | 296/68 |
| 4,120,530 | A | * | 10/1978 | Imbro | 297/337 |
| 4,141,094 | A | * | 2/1979 | Ferguson et al. | 5/85.1 |
| 4,343,482 | A | | 8/1982 | Wegner | |
| 4,415,202 | A | * | 11/1983 | Pew | 5/86.1 |
| 4,486,048 | A | | 12/1984 | Meyer | |
| 4,598,944 | A | * | 7/1986 | Meyer et al. | 297/183.9 |
| 4,929,022 | A | * | 5/1990 | Geraci | 297/313 |
| 4,951,766 | A | * | 8/1990 | Basedow et al. | 180/6.5 |
| 5,022,810 | A | * | 6/1991 | Sherrow et al. | 414/501 |
| 5,039,165 | A | * | 8/1991 | Rothman et al. | 297/338 |
| 5,577,753 | A | | 11/1996 | Pociask | |
| 5,608,925 | A | | 3/1997 | Porter | |
| 5,884,929 | A | * | 3/1999 | Kincaid | 280/304.1 |
| 6,062,600 | A | * | 5/2000 | Kamen et al. | 280/755 |
| 6,164,674 | A | | 12/2000 | Rogers et al. | |
| 6,250,717 | B1 | | 6/2001 | Porcheron | |
| 6,547,265 | B1 | | 4/2003 | Enge et al. | |
| 6,769,705 | B1 | | 8/2004 | Schlangen | |
| 7,086,103 | B2 | * | 8/2006 | Barthelt | 5/613 |
| 2001/0010099 | A1 | * | 8/2001 | Shero | 4/480 |
| 2002/0053778 | A1 | | 5/2002 | Howard | |

* cited by examiner

*Primary Examiner*—Anne Marie M Boehler

(57) ABSTRACT

A double amputee conveyance includes a main frame with two rear wheels, for propulsion, and two swiveled castor wheels, for directional control, attached to the main frame. A seat assembly is attached to the main frame to provide relative movement between a rearward and a forward position and is constructed so that a forward edge extends beyond the main frame in the forward position. A stabilizing mechanism includes a stabilizing bar pivotally attached to the main frame so as to extend outwardly in a forward direction from the main frame and for movement between a raised and a lowered position. An activating lever is linked to the stabilizing bar to move the bar into the raised or the lowered position. The stabilizing bar engages the floor in the lowered position to stabilize the conveyance with the seat assembly in the forward position.

9 Claims, 9 Drawing Sheets

FIG. 8
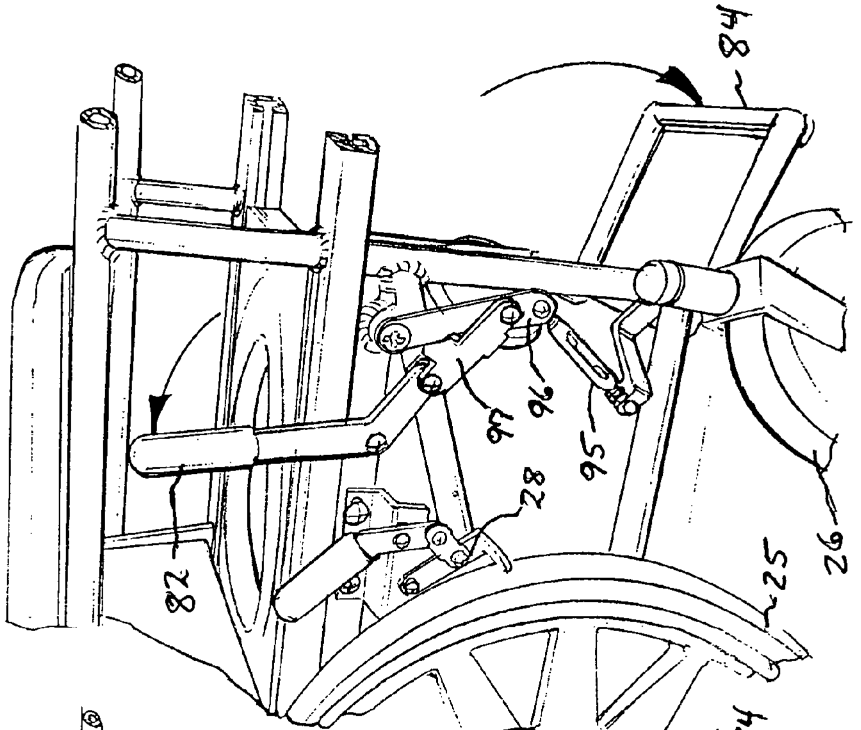
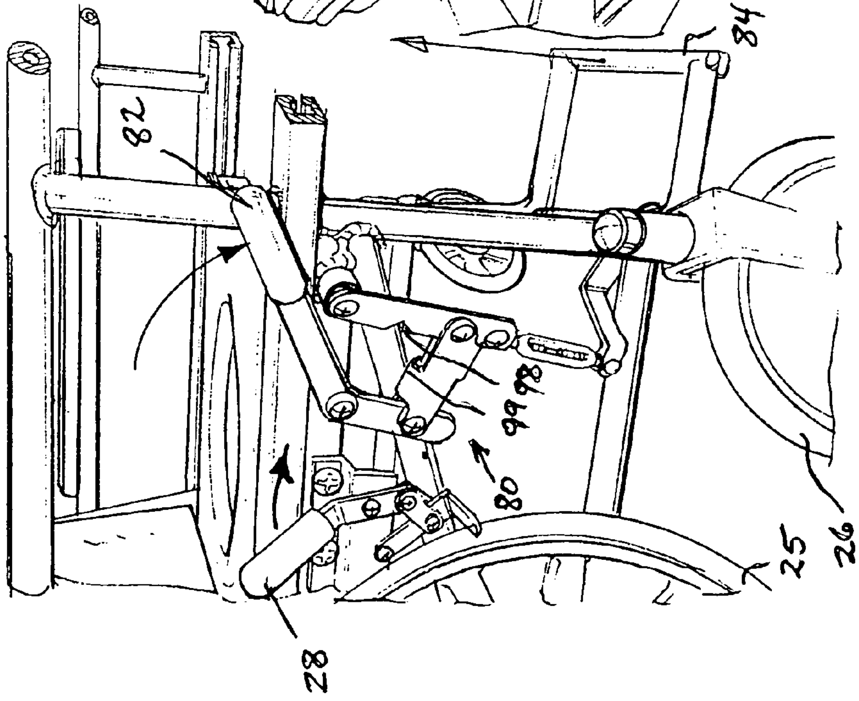
FIG 7

DOUBLE AMPUTEE CONVEYANCE

FIELD OF THE INVENTION

This invention generally relates to a conveyance for double amputees and more specifically to a wheelchair for daily use by individuals with both legs removed.

BACKGROUND OF THE INVENTION

Individuals with both legs removed above the knees have great difficulty in using a standard wheelchair to perform their daily functions, such as bathing and use of a shower stall, use of the bathroom commode, and sitting at a table for their daily meals. Standard wheelchairs are generally constructed to provide transportation of individuals with a wide variety of handicaps but are rarely designed to accommodate, for example, double amputees during their daily functions.

A typical example of a prior art wheelchair is disclosed in U.S. Pat. No. 4,343,482, entitled "Wheelchair". This structure is designed with permanent footrests extending forwardly from the frame. The wheelchair is designed specifically to allow handicapped persons to use a toilet and to this end a seat with a central opening is provided. The wheelchair is constructed to be backed over a commode. However, the wheelchair would be of little or no use to a double amputee since it would be extremely difficult to enter and exit the structure.

Another typical example of a prior art wheelchair is disclosed in U.S. Pat. No. 4,486,048, entitled "Leg Support For a Wheelchair". This structure is designed with footrests extending forwardly from the frame and which pivot upwardly into a horizontal position. Again, this wheelchair would be of little or no use to a double amputee.

A wheelchair described in U.S. Pat. No. 5,608,925, entitled "Wheelchair with Bed Pan", while more useful to a double amputee, is constructed only for the single purpose of using it as a commode (bed pan). It would be virtually impossible for a double amputee to enter and exit this wheelchair alone.

Another example of a prior art wheelchair is disclosed in U.S. Pat. No. 6,164,674, entitled "Adjustable Wheelbase Wheelchair". This structure is again designed with permanent footrests extending forwardly from the frame. This wheelchair is designed specifically to allow "on-the-fly" adjustments to the width. The structure allowing these adjustments is positioned below the seat and would impede any movement of the wheelchair over objects.

A prior art wheelchair described in U.S. Pat. No. 6,250,717 and entitled "Hinge Block for the Arm-Rest of a Wheelchair for the Handicapped, and a Corresponding Wheelchair" is constructed to support an individual in an upright position. This wheelchair is constructed so that portions pivot from a standard chair position into a vertical position with the footrests on or adjacent the ground and the arm-rests hold the person against the structure. A wheelchair of this type would be completely useless to a double amputee.

A prior art wheelchair described in U.S. Pat. No. 6,547,265 and entitled "Transfer Wheelchair" is constructed with an unobstructed seating platform for loading and unloading the user. A main problem with this type of wheelchair is that the user must rely on a caregiver to at least aid in the loading and unloading.

A prior art wheelchair described in U.S. Pat. No. 6,769,705 and entitled "Wheelchair" is constructed to accommodate different size seats and to simplify repair, etc. This wheelchair uses extruded metal beams that slide together so that welds are not used in the construction. Footrests and wheels are simply engaged with the beams, rather than being permanently welded. The chair is held fixedly in place by vertical extensions of rearwardly extending handles and arm rests on each side of the seat. The vertical extensions are coaxially inserted into tubular members affixed to the frame. This patent simply describes a standard wheelchair that is constructed in a different way to allow repair and modifications in size.

It would be highly advantageous, therefore, to remedy the foregoing and other deficiencies inherent in the prior art.

Accordingly, it is an object of the present invention to provide a new and improved double amputee conveyance.

Another object of the invention is to provide a new and improved wheelchair that is useful to individuals with both legs removed to perform their daily functions, such as bathing and use of a shower stall, use of the bathroom commode, and sitting at a table for their daily meals.

Another object of the invention is to provide a new and improved that wheelchair that is useful to individuals with both legs removed to perform various daily functions with little or no help from other individuals.

SUMMARY OF THE INVENTION

Briefly, to achieve the desired objects of the instant invention in accordance with a preferred embodiment thereof, provided is a double amputee conveyance. The conveyance includes a main frame with two rear wheels, for propulsion, and two swiveled castor wheels, for directional control, attached to the main frame. A seat assembly is attached to the main frame to provide relative movement between a rearward and a forward position and is constructed so that a forward edge extends beyond the main frame in the forward position. A stabilizing mechanism includes a stabilizing bar pivotally attached to the main frame so as to extend outwardly in a forward direction from the main frame and for movement between a raised and a lowered position. An activating lever is linked to the stabilizing bar to move the bar into the raised or the lowered position. The stabilizing bar engages the floor in the lowered position to stabilize the conveyance with the seat assembly in the forward position.

The desired objects of the instant invention are further achieved through a method by which a double amputee transfers between a conveyance and a bed. The method includes a step of providing a double amputee conveyance including a main frame with two rear wheels and two swiveled castor wheels attached to the main frame, rear wheel brakes, a seat assembly attached to the main frame to provide relative movement between a rearward and a forward position and constructed so that a forward edge extends beyond the main frame in the forward position, and a stabilizing bar pivotally attached to the main frame so as to extend outwardly in a forward direction from the main frame and for movement between a raised and a lowered position. The method further includes the steps of sitting on the seat assembly with the seat assembly in the rearward position and propelling the conveyance adjacent a bed, locking the rear wheel brakes, moving the stabilizing bar into the lowered position, moving the seat assembly into the forward position so a forward edge of the seat assembly overlaps an edge of the bed, and transferring from the seat assembly onto the bed.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 7 is a side view in perspective of the conveyance of FIG. 1 illustrating a second position of the stabilizing assembly;

FIG. 8 is a front exploded view in perspective, portions thereof broken away and shown in section, of the conveyance of FIG. 1 illustrating assembly of the seat in the frame;

DETAILED DESCRIPTION OF A PREFERRED EMBODIMENT

Figure 1:
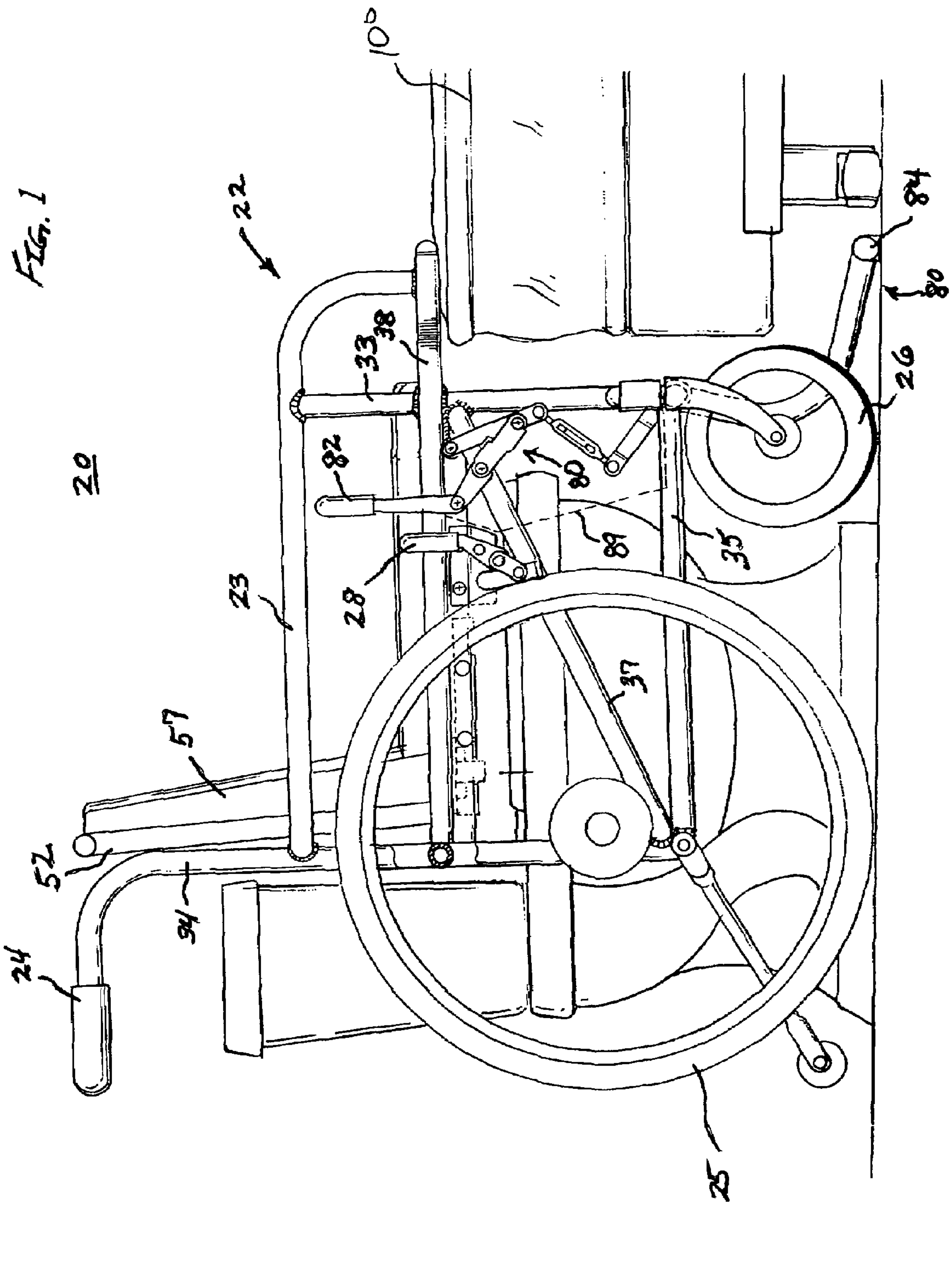
FIG. 1 is a side view of a double amputee conveyance in accordance with the present invention.

Turning now to the drawings, attention is first directed to FIG. 1, which illustrates a double amputee conveyance 20 in accordance with the present invention. It will be understood that conveyance 20 is designed primarily (although not exclusively) for individuals who have both legs removed above the knees, hereinafter referred to as "double amputees". A main feature of conveyance 20 is that a double amputee can use it to perform many daily functions, as will be described presently, without requiring the assistance of additional people or care givers.

Conveyance 20 includes a main frame 22. An arm rest 23 is attached to each side of main frame 22 in any conventional manner. Two handles 24 are attached to main frame 22 and extended upwardly and rearwardly therefrom in a conventional manner to provide propulsion from a caregiver in certain applications. Two rear wheels 25, used for propulsion by the double amputee, are attached to main frame 22 and two swiveled castor wheels 26 are attached to the main frame at the front to allow for directional control. Wheel brakes 28 are attached to each side of main frame 22 and positioned to engage or disengage rear wheels 24. Rear wheels 25, castor wheels 26, and wheel brakes 28 are relatively standard components and, therefore, will not be discussed in detail further.

Figure 2:
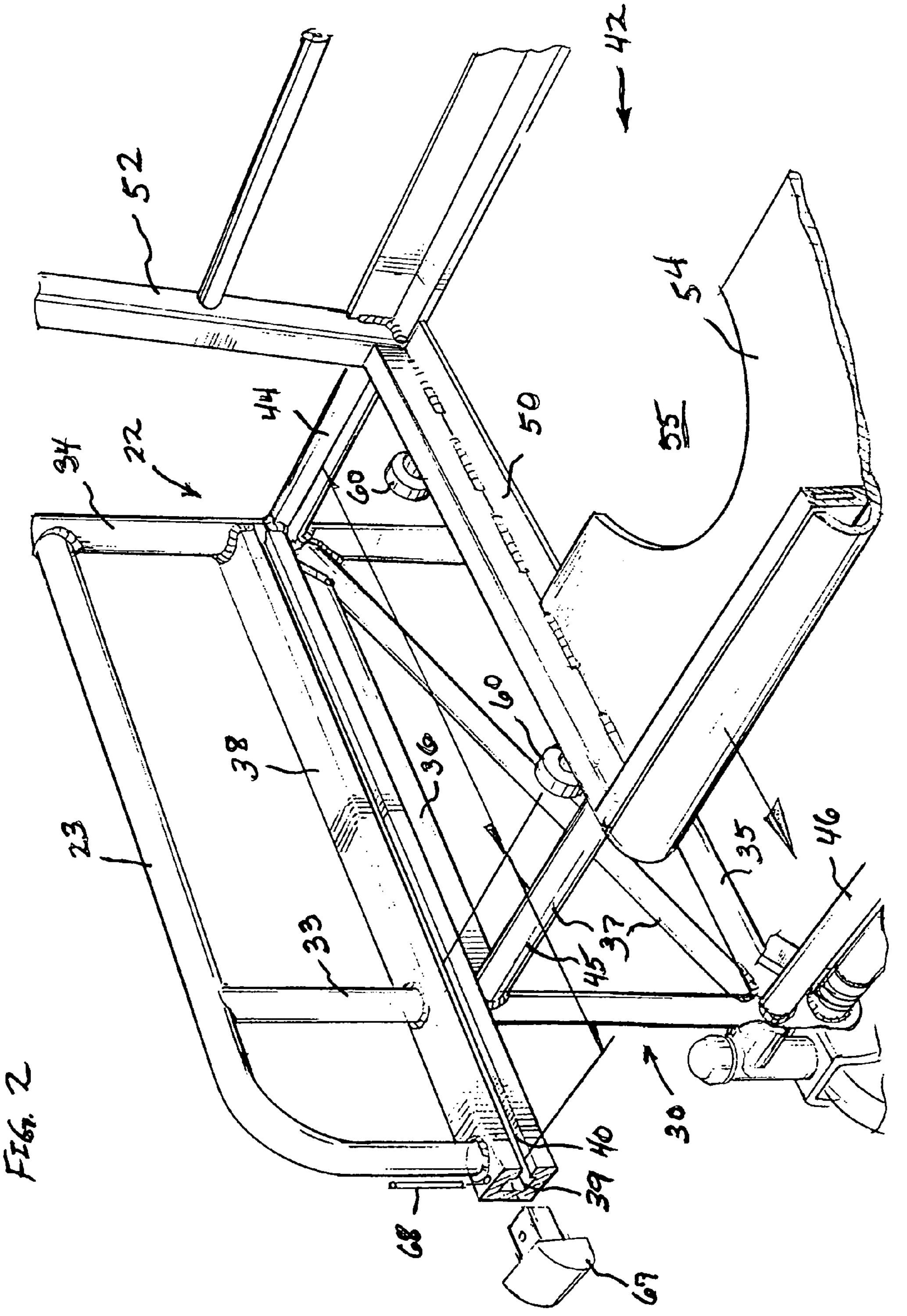
FIG. 2 is a side view in perspective of the conveyance of FIG. 1, portions thereof broken away and shown in section, illustrating a first position of a stabilizing assembly.

Referring additionally to FIG. 2, main frame 22 includes two side panels 30 and 32 that are mirror images (only panel 30 being shown in FIG. 2 and discussed herein). Panel 30 includes a pair of spaced apart vertical members 33 and 34 with vertical member 34 extending upwardly into handles 24 (see FIG. 1). A first horizontal member 35 extends between vertical members 33 and 34 adjacent the lower end thereof and a second horizontal member 36 extends between vertical members 33 and 34 approximately midway therealong. A pair of crossed braces 37 are affixed between members 33, 34, 35, and 36 to provide sufficient support for the structure.

A horizontal guide beam 38 extends from vertical member 34 beyond vertical member 33 a predefined distance (generally a distance of at least six inches and as much as eight or ten inches). Guide beam 38 is positioned just above horizontal member 36 and may actually rest on it if desired. Guide beam 38 has a generally rectangular cross-section with a longitudinally extending opening 39 therethrough. A horizontally facing, longitudinally extending slot 40 provides communication between a seat assembly 42 and opening 39. Arm rest 23 is spaced upwardly from second horizontal member 36 and extends from vertical member 34 forwardly over the upper end of vertical member 33 and bends downwardly so that the forward end is attached to a forward end of guide beam 38. It will be understood that the various members (i.e. 33, 34, 35, 36, and 37) and arm rest 23 can be formed of tubular material and welded or otherwise attached together in any convenient manner.

Three horizontal members 44, 45, and 46 extend between side panels 30 and 32 at the rear ends of members 36, at the front ends of members 36, and at the front end of members 35, respectively. Here it should be noted that no members or components extend across the rear of the opening defined by side panels 30 and 32 for purposes that will be explained in more detail presently. While the structure described for main frame 22 is considered sufficiently strong for most applications, additional braces or larger members can be used in special circumstances and the specific structure disclosed is not intend to limit the invention. Main frame 22 can be produced in a number of widths to accommodate any size of individual, in which widths of between 18 and 20 inches are considered standard widths.

Figure 16:
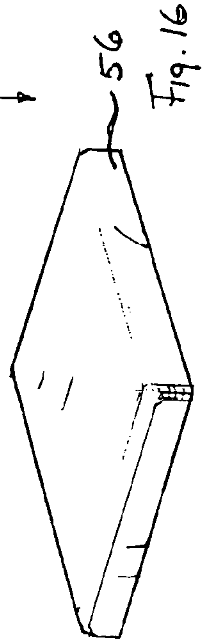
FIG. 16 is a perspective view of a commode panel for use with the conveyance of FIG. 1.

As illustrated in FIG. 2, seat assembly 42 includes a horizontal seat portion 50 and a fixedly attached, generally vertical back portion or back rest 52. While any desirable members of sufficient strength and weight may be utilized to form portions 50 and 52, in the present embodiment generally rectangular and/or square tubular members are used to provide sufficient strength while keeping the weight to a minimum. Further, a flat panel 54 with a central opening 55 is provided as the main seat or support for the main seat/cushion and also for a commode panel to be discussed later in this specification. Panel 54 extends between horizontal side and end members forming seat portion 50 and may be a rigid metal, such as sheet metal, or flexible material, such as canvas or the like, although panel 54 is preferably formed of rigid material. In the preferred embodiment, a removable seat cushion 56 (see FIG. 1 or 16) is positioned on flat panel 54 to provide comfort to the user and a back cushion 57 is supported against back rest 52.

Figure 3:
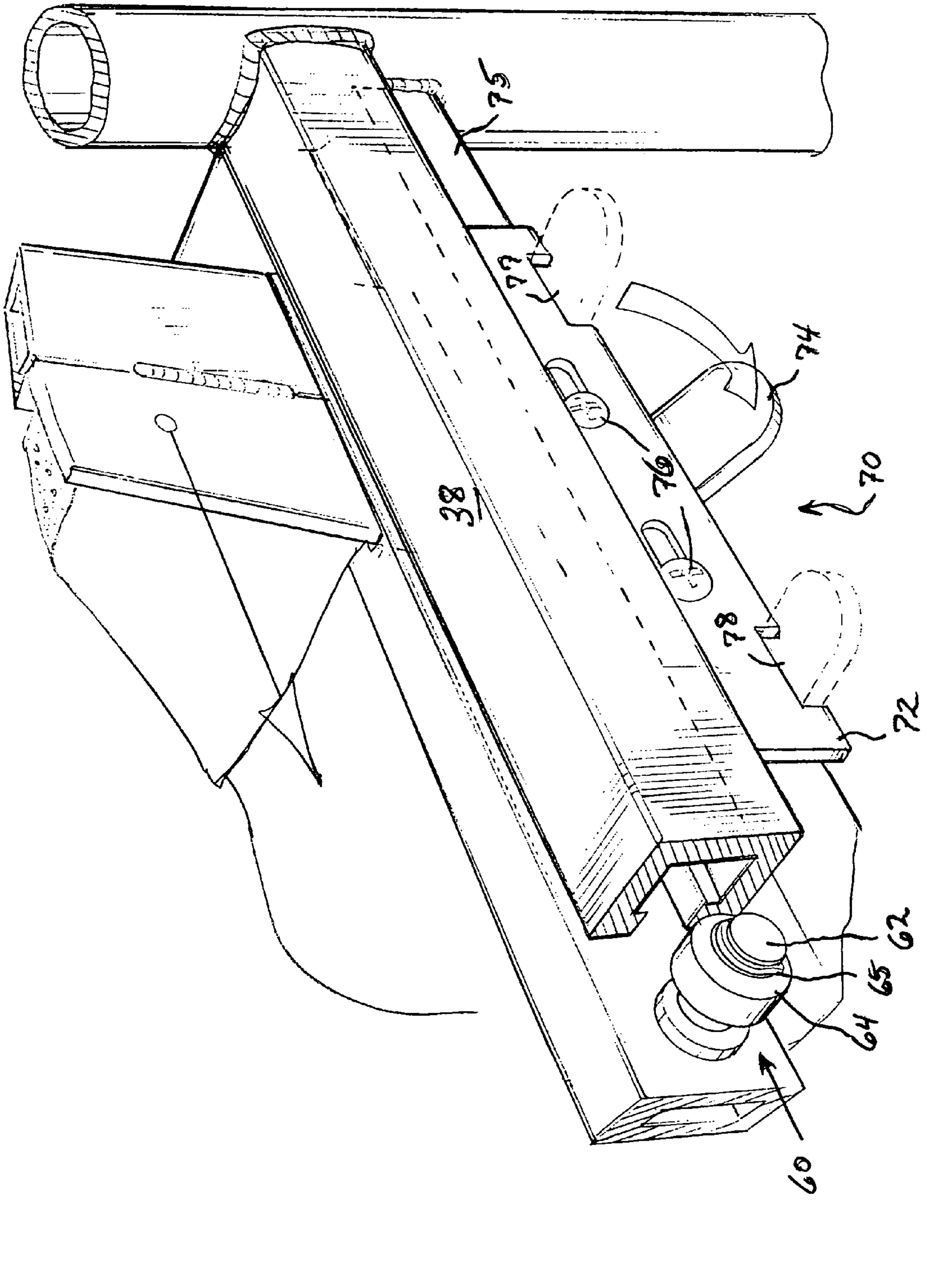
FIG. 3 is an enlarged side view in perspective, portions thereof broken away and shown in section, illustrating an adjustment portion of the seat assembly.

Referring additionally to FIG. 3, a pair of spaced apart roller elements 60 are attached to each side of seat portion 50 so as to extend horizontally outwardly from the sides thereof in opposite directions. As can best be seen in FIG. 5, each roller element 60 includes an axle 62 mounted to extend through the side brace of seat portion 50 and horizontally outwardly therefrom. A washer 63 is positioned on axle 62 and a bearing mounted roller 64 is positioned adjacent the outwardly extending end. A C-clamp 65 or other locking device holds roller 64 rotatably mounted on axle 62.

Roller 64 of each roller element 60 is selected to fit within longitudinally extending opening 39 of guide beam 38 with a reduced portion and axle 62 extending through slot 40. Washer 63 is positioned between the outer adjacent surfaces of guide beam 38 and seat portion 50 to reduce any friction therebetween. Thus, guide beams 38 on each side of seat portion 50 operate as rails for lateral horizontal movement of roller elements 60 and, therefore, seat assembly 42 relative to main frame 22. As can be seen in FIG. 2, a plug 67 is inserted in the end of each longitudinally extending opening 39 of guide beams 38 to prevent rollers 64 from inadvertently rolling completely out of guide beams 38. In this embodiment plug 67 is held in place by a vertical (or horizontal) pin 68. Thus, seat assembly 42 is mounted to move between a normal or rearward position adjacent the rear of main frame 22 and a forward position in which the front edge of seat portion 50 extends outwardly beyond the front edge of main frame 22 and beyond castor wheels 26.

Referring additionally to FIGS. 3 through 6, a latching mechanism generally designated 70 includes a multi-position locking plate 72 affixed to main frame 22 and a locking lever 74 affixed to seat assembly 22. In this embodiment, a single latching mechanism 70 is provided on the left side of seat assembly 50 but it will be understood that it could be mounted on either side or, in some special applications one could be mounted on each side. Also, the relative positions of locking plate 72 and locking lever 74 could be reversed, if desired. Further, the specific latching mechanism 70 described herein is used because of its convenience and reliability but other mechanisms could be used if desired.

A downwardly directed flange 75 is affixed to the lower surface of beam 38 and, in this embodiment, extends between vertical members 33 and 34 of main frame 22 to provide extra support and to strengthen latching mechanism 70. Locking plate 72 is affixed to flange 75 by bolts 76 which extend through elongated slots in locking plate 72 and through holes in flange 75. Two downwardly directed and spaced apart locking slots 77 and 78 are formed in the lower edge of locking plate 72. Bolts 76 and the elongated slots provide for adjustment of the position of locking slots 77 and 78 along flange 75 and thus along the side of main frame 22.

Figure 5:
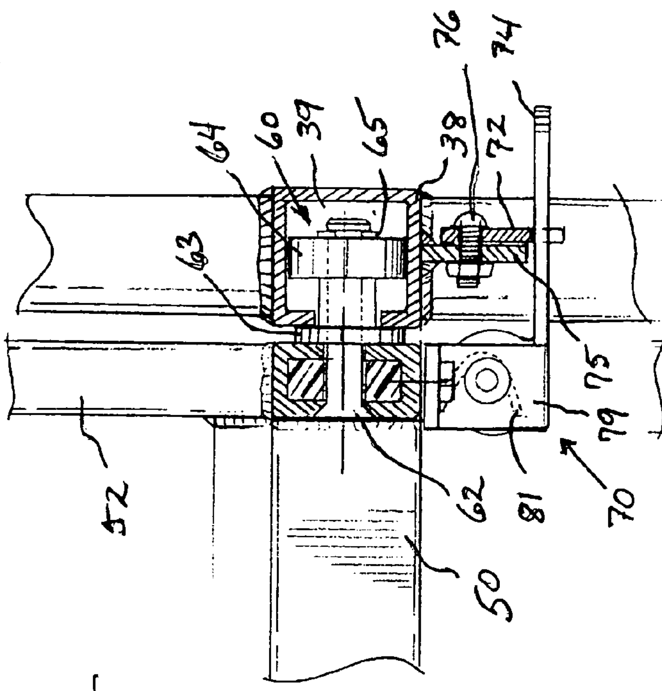
FIG. 5 is an enlarged front view of the portion of the frame and seat assembly and adjustment portion illustrated in FIG. 6.
Figure 6:
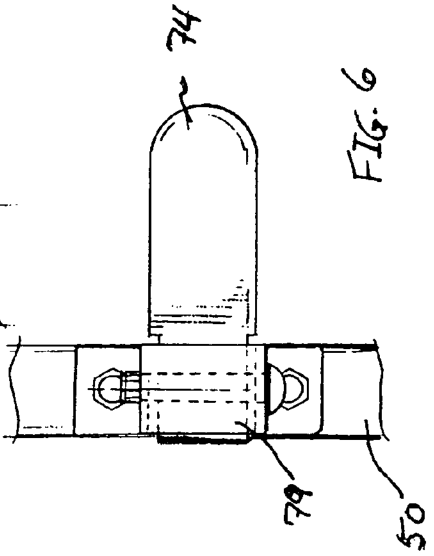
FIG. 6 is an enlarged bottom view of the adjustment portion of the seat assembly.
Figure 4:
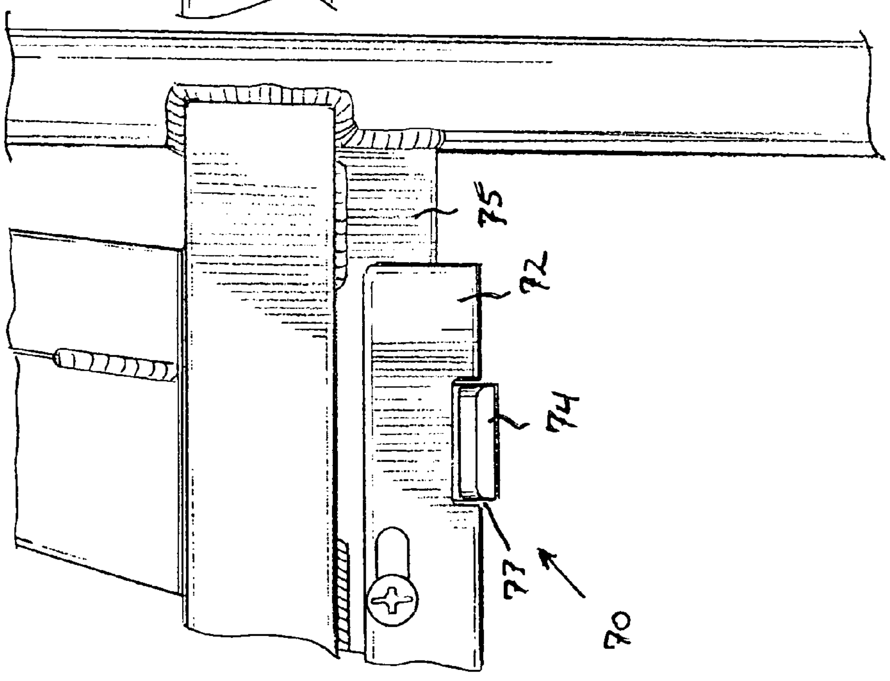
FIG. 4 is an enlarged side view of a portion of the frame and seat assembly, including the adjustment portion.

Referring specifically to FIGS. 5 and 6, it can be seen that locking lever 74 includes an elongated lever (designated 74) having one end rotatably mounted in a U-shaped bracket 79 that is attached to the underside of horizontal seat portion 50. A torsion spring 81 biases lever 74 so that the outer free end is biased upwardly against locking plate 72. As seat assembly 42 is moved rearwardly, locking lever 74 is biased into locking engagement with locking slot 77 and seat assembly 42 is held firmly in the rearward position. By pushing downwardly on locking lever 74 and moving seat assembly 42 forward, latching mechanism 70 is disengaged. Seat assembly 42 can then be moved forward until locking lever 74 is biased into locking slot 78 at which time seat assembly 42 is locked firmly in the forward position.

Returning to FIG. 1 and referring additionally to FIGS. 7 and 8, a stabilizing mechanism 80 is illustrated at the front of main frame 22. Stabilizing mechanism 80 includes an activating lever 82, pivotally mounted to main frame 22 within easy reach of an individual in conveyance 20, and a stabilizing bar 84, pivotally mounted to the front of main frame 22 for movement between a raised position (illustrated in FIG. 7) and a lowered or floor engaging position (illustrated in FIGS. 1 and 8). Lever 82 is connected to stabilizing bar 84 by a linking assembly so that moving lever 82 into a forward position pivots stabilizing bar 84 upwardly into the raised position and moving lever 82 into a rearward position pivots stabilizing bar 84 downwardly into the lowered or floor engaging position. While other stabilizing mechanisms may be incorporated if desired, mechanism 80 is disclosed in the preferred embodiment because of its convenience and reliability. Referring to FIG. 1, a protective cover is depicted in phantom outline and is generally designated by the reference character 89. Cover 89, which may be fashioned of metal or plastic or the like, may be attached to frame 22 with bolts or welding or the like, and functions to cover mechanism 80 for preventing users from pinching their fingers during use of mechanism 80.

Figure 9:
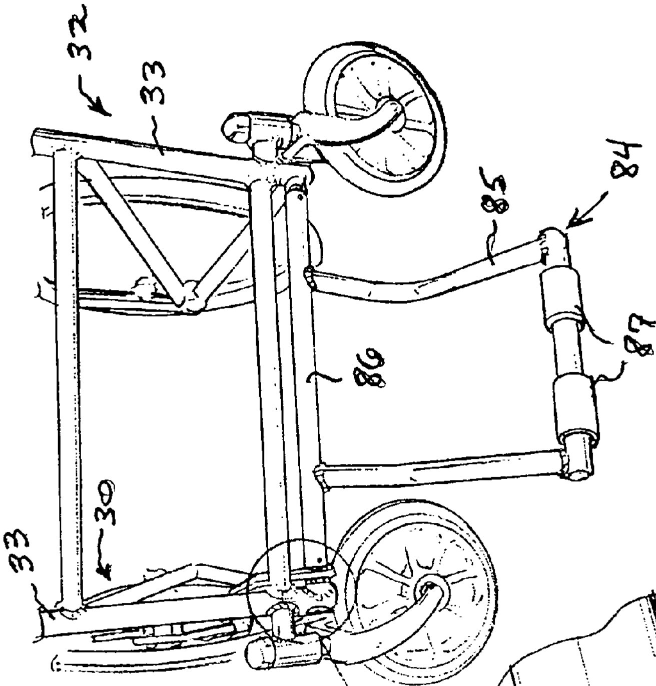
FIG. 9 is a front view of the conveyance of FIG. 1, portions thereof broken away and shown in section, illustrating the stabilizing assembly.
Figure 10:
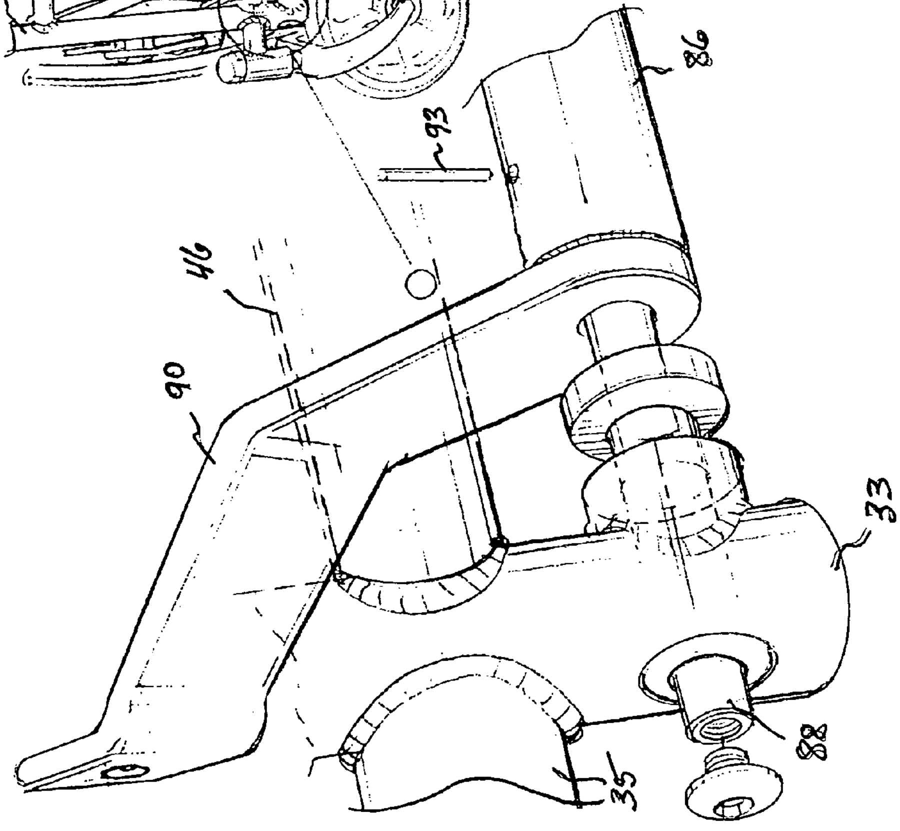
FIG. 10 is an enlarged view in perspective of a portion of the stabilizing assembly (circled in FIG. 9), illustrating the mounting structure.
Figure 11:
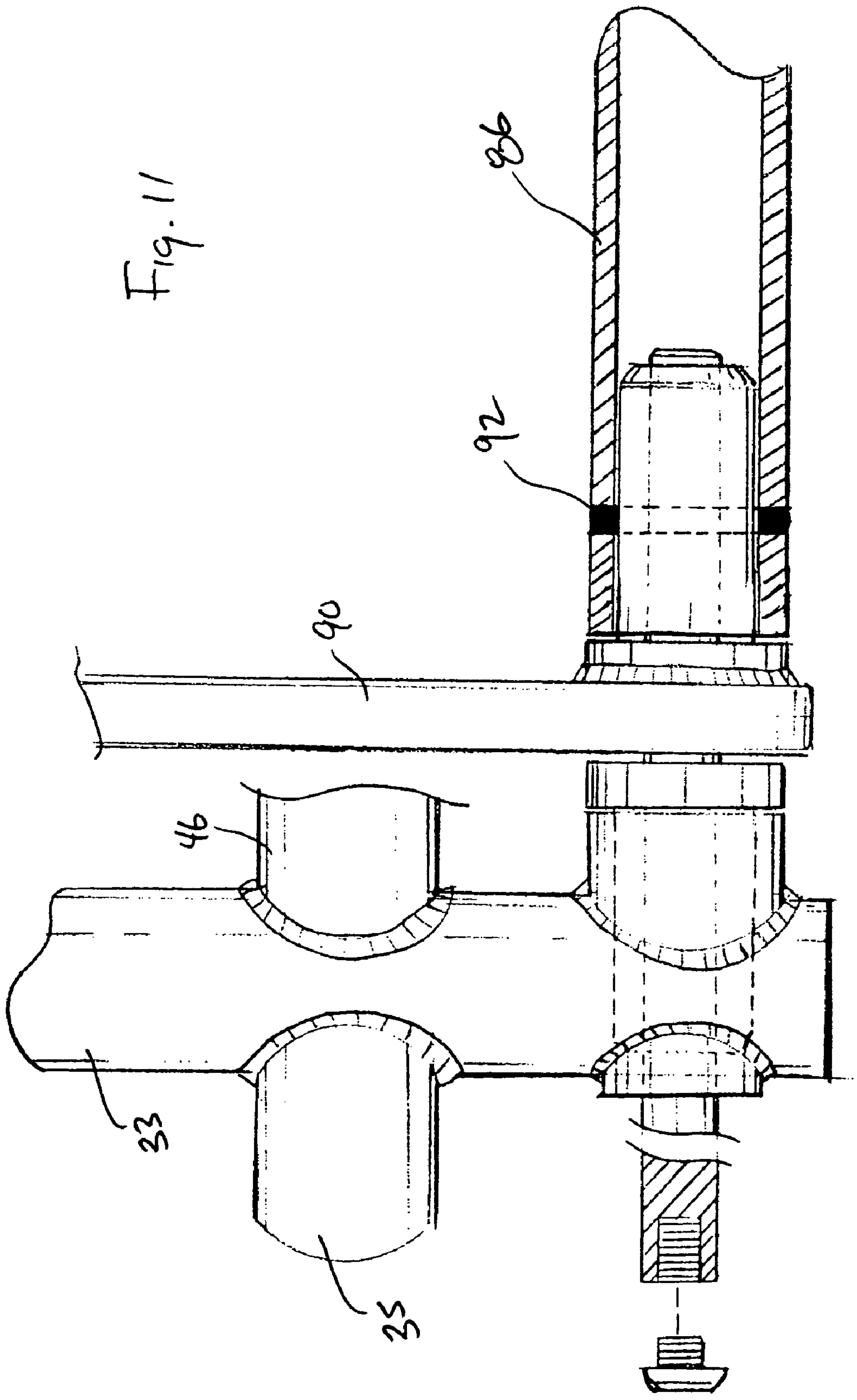
FIG. 11 is an enlarged front view of the portion of the stabilizing assembly illustrated in FIG. 10.

Referring additionally to FIGS. 9, 10 and 11, stabilizing bar 84 includes a generally U-shaped element 85 positioned so that the bight moves between the raised and lowered positions and with the ends of the arms fixedly attached to an elongated tubular member 86. Tubular member 86 is rotatably mounted on an axle 88 that extends coaxially through tubular member 86 and the lower ends of the front vertical members 33 of each side panel 30 and 32 of main frame 22. A lever arm 90 is rotatably mounted on axle 88 and includes a hub 92 (illustrated in FIG. 11) that extends coaxially into tubular member 86 and is pinned to tubular member 86 by a pin 93 for common rotation of lever 90 and tubular member 86.

Lever arm 90 is linked to activating lever 82 by a series of links, in this preferred embodiment three links 95, 96, and 97. One end of link 95 is attached to the upper end of lever arm 90 and the other end is attached to one end of link 96. The other end of link 96 is pivotally attached to horizontal member 36 of side panel 30. One end of link 97 is attached to link 96 adjacent the first or lower end and the other end of link 97 is attached to the lower end of activating lever 82.

In this embodiment link 95 is adjustable in length (e.g. using a turnbuckle) to ensure that stabilizing bar 84 moves completely between the raised and lowered positions. Also, link 96 is provided with a notch 98 in a side thereof and link 97 includes a stop 99 that is engaged in notch 98 when stabilizing bar 84 is in the lowered position to ensure that the linkage and thus stabilizing bar 84 cannot move out of the lowered position when upward pressure is applied to stabilizing bar 84. Further, stabilizing bar 84 has resilient pads or cylinders 87 (e.g. rubber or the like) attached thereto for providing additional gripping action to further reduce the possibility of movement of conveyance 20 when stabilizing bar 84 is in the lowered position.

Figure 12:
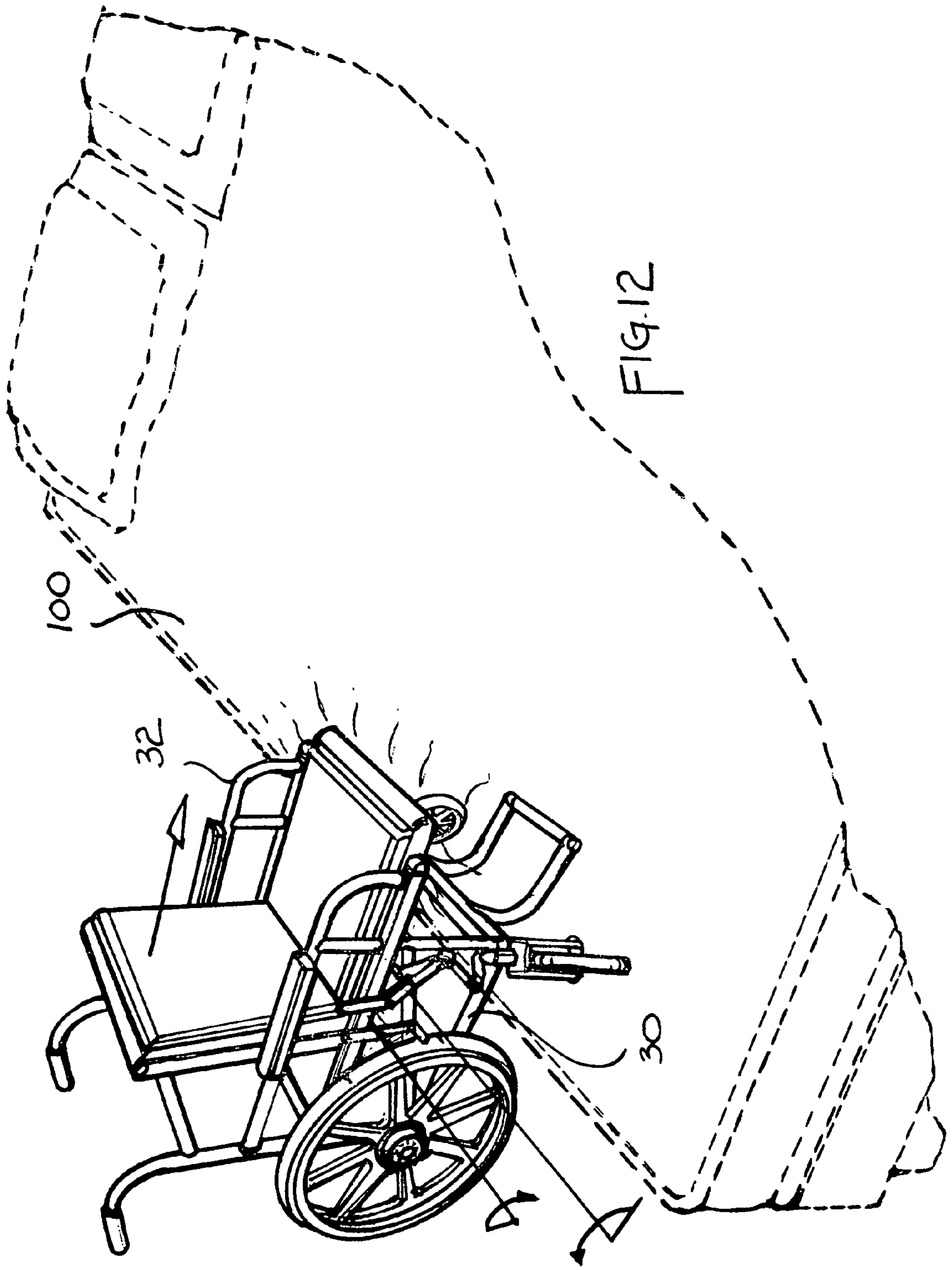
FIG. 12 is a top view in perspective of the conveyance of FIG. 1, diminished in size, illustrating one function thereof.
Figure 13:
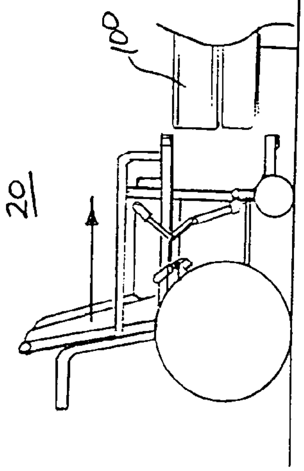
FIGS. 13 and 14 are side views of the conveyance as illustrated in FIG. 12, illustrating relative positions and movement of the stabilizing assembly.
Figure 14:
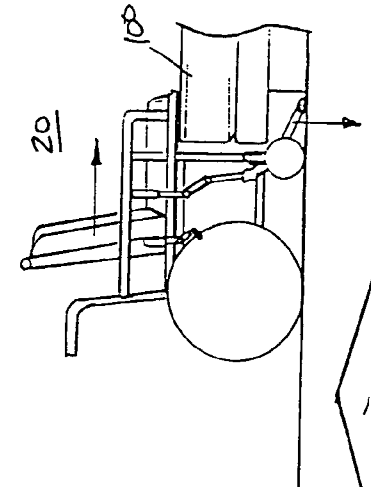

In operation, referring to FIGS. 12, 13, and 14, an individual sitting in conveyance 20 moves to a position adjacent a bed 100 (for example). Conveyance 20 is constructed so that seat portion 50 of seat assembly 42 is approximately equal to the upper surface of bed 100 and with no encumbrances (e.g. foot rests or the like) in the front. The individual then sets the brake or otherwise locks the wheels, e.g. by pushing brake lever 28 forwardly. The individual then pivots activating lever 82 rearward to move stabilizing bar 84 into the lowered position. Seat assembly 42 can now safely be moved into the forward position by pushing downward on locking lever 74 and putting forward pressure on seat assembly 42 until locking lever 74 is engaged in forward slot 77 of locking plate 72 (see FIG. 14). Because stabilizing bar 84 prevents any tipping of conveyance 20, it is safe and convenient for the individual to move from conveyance 20 onto bed 100. Movement from bed 100 to conveyance 20 can be accomplished by simply reversing the procedure, namely, by moving from the bed to conveyance 20 with the brake, seat assembly 42 and stabilizing bar 84 engaged as described above.

Generally, movement of seat assembly 42 between the rear or normal position and the forward position is approximately six inches, although more or less can be provided if desired. This ensures that the individual will be well into bed 100 when he or she is completely disengaged from conveyance 20. Also, seat assembly 42 overlaps the edge of bed 100 by the amount it moves forward. The portions of seat assembly 42 that engage the bed 100 are smooth so as to prevent snagging.

Figure 17:
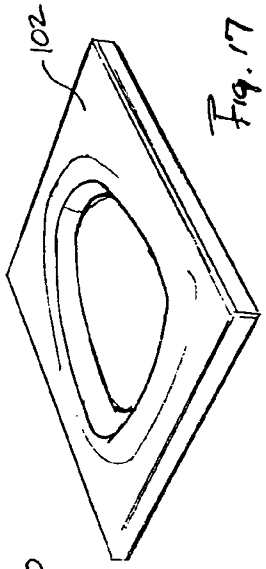
FIG. 17 is a perspective view of a seat cushion for use with the conveyance of FIG. 1.
Figure 15:
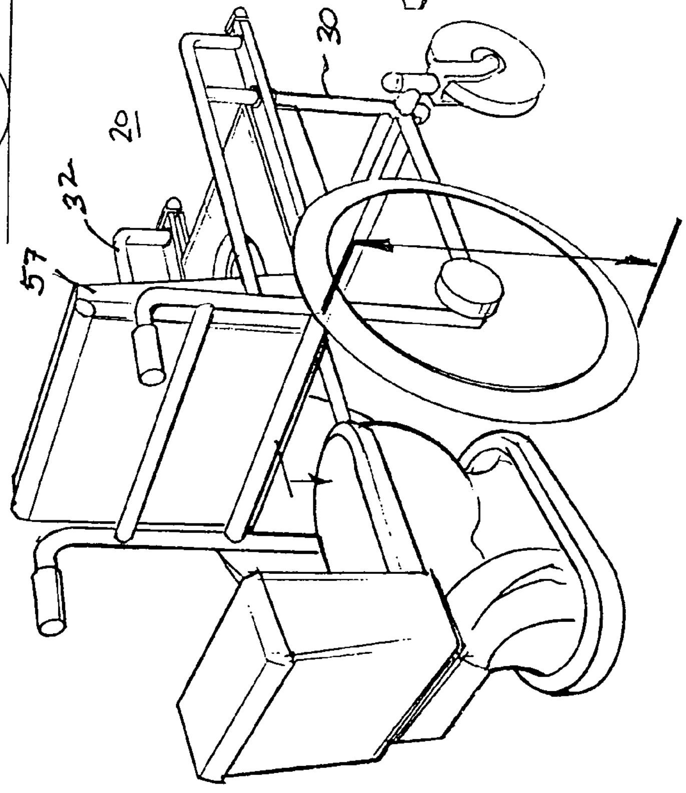
FIG. 15 is a rear perspective view of the conveyance of FIG. 1 shown as it would appear positioned relative to a toilet.

In this embodiment, seat assembly 42 has two inserts, cushion 56 and a commode panel 102, as illustrated in FIG. 17. For an individual to use the commode they simply remove the cushion 56 and insert commode panel 102. With commode panel 102 in place, the individual transfers himself or herself to conveyance 20 from a bed or the like, as explained above. They then propel conveyance 20 to the bathroom and back up astride the commode/toilet as seen in FIG. 15. There are no encumbrances under or at the rear of conveyance 20 so that this operation is easily performed.

To take a shower, for example, cushion 56 is placed in seat assembly 42 and the individual transfers from a bed or the like to conveyance 20, as described above. Conveyance 20 is propelled to the bathroom and moved to the end of a shower stall chair (not illustrated). The brakes are engaged and the stabilizing bar is lowered and locked in place. The shower stall chair is adjusted, prior to its use, to a height that allows the moving seat assembly to pass over an end of the shower chair. The individual unlatches seat assembly 42, moves it into the forward position, and transfers to the shower chair. Once the shower is completed the process is simply reversed to transfer back into conveyance 20 and leave the bathroom.

Conveyance 20 can also be used for many other functions including, for example, dining at a table. The edge of a standard table is usually twenty nine to thirty inches from the floor and the height of arm rests 23 is designed to fit under such standard tables. Thus, an individual simply places cushion 56 in seat assembly 42 and transfers to conveyance 20, as described above. Conveyance 20 is then propelled into position at the table and the brakes are locked. It is not generally required to lower stabilizing bar 84 or move the position of seat assembly 42.

Thus, a new and improved double amputee conveyance has been disclosed. The new and improved conveyance or wheelchair is useful to individuals with both legs removed to perform their daily functions, such as bathing and use of a shower stall, use of the bathroom commode, and sitting at a table for their daily meals. Further, the new and improved conveyance or wheelchair is useful to individuals with both legs removed to perform various daily functions with little or no help from other individuals.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. A double amputee conveyance comprising:

a main frame with two rear wheels, for propulsion, and two swiveled castor wheels, for directional control, attached to the main frame;

a seat assembly including a horizontal seat portion and a generally vertical back portion together defining a sitting position of the seat assembly, the seat assembly being attached to the main frame to provide movement of the seat assembly in the sitting position between a normal or rearward position and a forward position relative to the main frame, the seat assembly being slidably attached to an upper horizontal member of the main frame by means of a pair of spaced roller elements on each side of the seat assembly, each said roller element being rotatably mounted to the mating surface of an axle, said axle being fixedly attached to side brace of seat assembly, said roller elements being selected to fit within a longitudinally extending hollow channel with a slot open to the inward side of the main frame of the wheelchair, with axle extending through slot, and the seat assembly being constructed so that a forward edge extends beyond the main frame in the forward position, and the horizontal seat portion and seat assembly also being constructed so that they are free of attached footrests and other encumbrances to permit the seat assembly when in the forward position to be positioned on a surface parallel with respect to the seat assembly and so enabling unimpeded ingress and egress relative to the seat assembly from the horizontal seat portion; and a stabilizing mechanism including an activating lever, a stabilizing bar, and resilient pads, the stabilizing bar being pivotally attached to the main frame so as to extend outwardly in a forward direction from the main frame and for movement between a raised and a lowered position, resilient pads constructed of slip-resistant material being fixedly attached to the stabilizing bar, said pads being formed such that a flat rectangular area contacts a floor, said pads making slip-resistant areal contact with a floor when the bar is in the lowered position, the activating lever being linked to the stabilizing bar so as to move the bar into either of the raised and the lowered positions, the resilient pads fixedly attached to the stabilizing bar, said pads engaging a floor in the lowered position to stabilize the conveyance with the seat assembly in the forward position.

2. A double amputee conveyance as claimed in claim 1 wherein the seat assembly is constructed so that the forward edge extends beyond the main frame at least six inches with the seat assembly in the forward position.

3. A double amputee conveyance as claimed in claim 1 further including a latching mechanism connected to the main frame and the seat assembly to lock the seat assembly in each of the rearward position and the forward position.

4. A double amputee conveyance as claimed in claim 1 further including rear wheel brakes connected to the main frame and the rear wheels.

5. A double amputee conveyance as claimed in claim 1 further including a cushion insert and a commode insert each constructed to be individually inserted into the seat assembly.

6. A double amputee conveyance as claimed in claim 1 wherein the main frame is constructed without encumbrances to provide for positioning the seat assembly above a commode.

7. A double amputee conveyance as claimed in claim 1 further including apparatus designed to lock the stabilizing bar in either of the raised position or the lowered position.

8. A double amputee conveyance comprising:

a main frame with two rear wheels, for propulsion, and two swiveled castor wheels, for directional control, attached to the main frame, rear wheel brakes connected to the main frame and the rear wheels, and the main frame being constructed without encumbrances to provide for positioning the seat assembly above a commode;

a seat assembly including a horizontal seat portion and a generally vertical back portion together defining a sitting position of the seat assembly, the seat assembly being attached to the main frame to provide movement of the seat assembly in the sitting position between a normal or rearward position and a forward position relative to the main frame, the seat assembly being slidably attached to an upper horizontal member of the main frame by means of a pair of spaced roller elements on each side of the seat assembly, each said roller element being rotatably mounted to the mating surface of an axle, said axle being fixedly attached to side brace of seat assembly, said roller elements being selected to fit within a longitudinally extending hollow channel with a slot open to the inward side of the main frame of the wheelchair, with axle extending through slot, the seat assembly being constructed so that a forward edge extends beyond the main frame in the forward position, and the horizontal seat portion and seat assembly also being constructed so that they are free of attached footrests and other encumbrances to permit the seat assembly when in the forward position to be positioned on a surface parallel with respect to the seat assembly and so enabling unimpeded ingress and egress relative to the seat assembly from the horizontal seat portion, and a latching mechanism connected to the main frame and the seat assembly to lock the seat assembly in each of the rearward position and the forward position; and a stabilizing mechanism including an activating lever, a stabilizing bar, and resilient pads, the stabilizing bar being pivotally attached to the main frame so as to extend outwardly in a forward direction from the main frame and for movement between a raised and a lowered position, resilient pads constructed of slip-resistant material being fixedly attached to the stabilizing bar, said pads being formed such that a flat rectangular area contacts a floor, said pads making slip-resistant areal contact with a floor when the bar is in the lowered position, linking apparatus connecting the activating lever to the stabilizing bar so as to move the bar into either of the raised position and the lowered position, the resilient pads fixedly attached to the stabilizing bar, said pads engaging a floor in the lowered position to stabilize the conveyance with the seat assembly in the forward position, and the linking apparatus being designed to lock the stabilizing bar in either of the raised position or the lowered position.

9. A double amputee conveyance as claimed in claim 8 wherein the seat assembly is constructed so that the forward edge extends beyond the main frame at least six inches with the seat assembly in the forward position.

* * * * *